(12) United States Patent
Wu et al.

(10) Patent No.: US 9,294,310 B2
(45) Date of Patent: Mar. 22, 2016

(54) METHOD AND APPARATUS FOR LTE CHANNEL STATE INFORMATION ESTIMATION

(75) Inventors: Huan Wu, Kanata (CA); Yongkang Jia, Kanata (CA); Sean Bartholomew Simmons, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 128 days.

(21) Appl. No.: 13/581,836

(22) PCT Filed: Oct. 8, 2010

(86) PCT No.: PCT/CA2010/001575
§ 371 (c)(1),
(2), (4) Date: Aug. 30, 2012

(87) PCT Pub. No.: WO2012/045143
PCT Pub. Date: Apr. 12, 2012

(65) Prior Publication Data
US 2012/0320783 A1 Dec. 20, 2012

(51) Int. Cl.
*H04B 7/04* (2006.01)
*H04L 25/02* (2006.01)
*H04L 1/00* (2006.01)
*H04L 1/20* (2006.01)
(Continued)

(52) U.S. Cl.
CPC .......... *H04L 25/0204* (2013.01); *H04B 7/0689* (2013.01); *H04L 1/0026* (2013.01); *H04L 1/0031* (2013.01); *H04L 1/20* (2013.01); *H04L 25/03343* (2013.01); *H04B 7/0452* (2013.01); *H04B 7/063* (2013.01); *H04B 7/0632* (2013.01); *H04B 7/0639* (2013.01); *H04B 7/0697* (2013.01); *H04L 25/0244* (2013.01); *H04L 25/0248* (2013.01); *H04W 24/10* (2013.01)

(58) Field of Classification Search
None
See application file for complete search history.

(56) References Cited

U.S. PATENT DOCUMENTS

| 7,199,661 B1 * | 4/2007 | Shirvani-Mahdavi | H03F 3/45085 |
| | | | 330/254 |
| 2005/0237920 A1 * | 10/2005 | Howard | H04B 7/0615 |
| | | | 370/208 |

(Continued)

FOREIGN PATENT DOCUMENTS

| CN | 101513094 | 8/2009 |
| WO | 2009/002097 A1 | 12/2008 |

(Continued)

OTHER PUBLICATIONS

Canadian Office Action dated Jan. 16, 2015, received for Canadian Application No. 2,813,636.
(Continued)

*Primary Examiner* — Hassan Phillips
*Assistant Examiner* — Ayanah George
(74) *Attorney, Agent, or Firm* — Jon Gibbons; Fleit Gibbons Gutman Bongini & Bianco P.L.

(57) ABSTRACT

A method, computer program, device and system are provided for determining channel state information for use in a wireless communications network. The channel state information includes a rank indicator (RI), precoding matrix index (PMI) and channel quality indicator (CQI). The RI, PMI or CQI can be determined based on channel covariance estimation and the Taylor series approximation of its inverse. Further, the RI and PMI can be determined separately.

24 Claims, 15 Drawing Sheets

Table 7.2.3-0: PDSCH transmission scheme assumed for CQI reference resource

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |

(51) Int. Cl.
*H04L 25/03* (2006.01)
*H04B 7/06* (2006.01)
*H04W 24/10* (2009.01)

(56) References Cited

U.S. PATENT DOCUMENTS

| | | | |
|---|---|---|---|
| 2007/0025460 A1* | 2/2007 | Budianu et al. | 375/260 |
| 2008/0235311 A1* | 9/2008 | Budianu | H04L 5/023 708/290 |
| 2009/0046570 A1 | 2/2009 | Sarkar et al. | |
| 2009/0080550 A1* | 3/2009 | Kushioka | H04J 11/00 375/260 |
| 2010/0002598 A1* | 1/2010 | Pan | H04B 7/063 370/252 |
| 2010/0103832 A1* | 4/2010 | Zhou | H04B 7/0417 370/252 |
| 2010/0254335 A1* | 10/2010 | Koo et al. | 370/329 |
| 2010/0322176 A1* | 12/2010 | Chen | H04B 7/024 370/329 |
| 2011/0080965 A1* | 4/2011 | Liu | H04L 25/0248 375/260 |
| 2013/0064276 A1* | 3/2013 | Kim | H04B 7/063 375/219 |

FOREIGN PATENT DOCUMENTS

| | | |
|---|---|---|
| WO | 2009002097 | 12/2008 |
| WO | 2010/015429 A1 | 2/2010 |
| WO | 2010/106549 A2 | 9/2010 |

OTHER PUBLICATIONS

Taiwan Search Report for Taiwan Application Serial No. 100135932, 1 p.
English translation of Taiwan Search Report for Taiwan Application Serial No. 100135932, 1p.
International Search Report mailed Jun. 23, 2011 in International Application Serial No. PCT/CA2010/001575, 3pp.
Chinese Office Action dated Apr. 15, 2015 received for Chinese Application No. 201080069487.9.

* cited by examiner

Table 7.2.3-0: PDSCH transmission scheme assumed for CQI reference resource

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |

FIG. 2

Table 7.2.3-1: 4-bit CQI Table

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 3

Table 6.3.4.2.3-1: Codebook for transmission on antenna ports {0,1}.

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

FIG. 4

Table 6.3.4.2.3-2: Codebook for transmission on antenna ports $\{0,1,2,3\}$.

| Codebook index | $u_n$ | Number of layers $\upsilon$ | | | |
|---|---|---|---|---|---|
| | | 1 | 2 | 3 | 4 |
| 0 | $u_0 = \begin{bmatrix} 1 & -1 & -1 & -1 \end{bmatrix}^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = \begin{bmatrix} 1 & -j & 1 & j \end{bmatrix}^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = \begin{bmatrix} 1 & 1 & -1 & 1 \end{bmatrix}^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = \begin{bmatrix} 1 & j & 1 & -j \end{bmatrix}^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = \begin{bmatrix} 1 & (-1-j)/\sqrt{2} & -j & (1-j)/\sqrt{2} \end{bmatrix}^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = \begin{bmatrix} 1 & (1-j)/\sqrt{2} & j & (-1-j)/\sqrt{2} \end{bmatrix}^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = \begin{bmatrix} 1 & (1+j)/\sqrt{2} & -j & (-1+j)/\sqrt{2} \end{bmatrix}^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = \begin{bmatrix} 1 & (-1+j)/\sqrt{2} & j & (1+j)/\sqrt{2} \end{bmatrix}^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = \begin{bmatrix} 1 & -1 & 1 & 1 \end{bmatrix}^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = \begin{bmatrix} 1 & -j & -1 & -j \end{bmatrix}^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = \begin{bmatrix} 1 & 1 & 1 & -1 \end{bmatrix}^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = \begin{bmatrix} 1 & j & -1 & j \end{bmatrix}^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = \begin{bmatrix} 1 & -1 & -1 & 1 \end{bmatrix}^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = \begin{bmatrix} 1 & -1 & 1 & -1 \end{bmatrix}^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = \begin{bmatrix} 1 & 1 & -1 & -1 \end{bmatrix}^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = \begin{bmatrix} 1 & 1 & 1 & 1 \end{bmatrix}^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

FIG. 5

METHOD AND APPARATUS FOR LTE CHANNEL STATE INFORMATION ESTIMATION

FIELD

The disclosure is related to wireless communications and, more particularly, to estimation approaches for channel state information.

BACKGROUND

In Long Term Evolution (LTE), user equipment (UE) periodically or aperiodically feedbacks channel state information (CSI) to a network node, e.g., enhanced or evolved NodeB (eNodeB or eNB), of a wireless network. The CSI includes among other things rank indicator (RI), precoding matrix index (PMI) and channel quality indicator (CQI). For PMI and CQI, two types of feedback, namely wideband report and subband report, are supported. For wideband report, all of the resource elements (REs) in the system bandwidth in one subframe can be used to generate the report. For the subband report, the REs in the specified bandwidth in a subframe only can be used. The Physical Layer procedures of the Standard is set forth in the document 3GPP, "LTE Physical Layer Procedures," ETSI TS 136 213, V8.7.0, June 2009.

The calculation of the CQI is conditioned on the current transmission mode and the best choice of the RI and PMI for the current channel. A straightforward way of selecting RI and PMI is to jointly estimate the two so that the optimum performance metrics is achieved. The joint estimation is normally done by iterating all the possible RIs and all the corresponding precoding matrices in the codebook and selecting the best pair of RI and PMI that yields the optimum metrics. See e.g., Texas Instruments, "Further Details on Codebook-Based Pre-coding for E-UTRA," 3GPP TSG RAN WG1 #47bis, January 2007, R1-070270. The two commonly used metrics are Mean-Square-Error (MSE), or equivalently Signal-to-Interference Plus Noise Ratio (SINR) and Mutual Information (MI, or capacity), and they do not appear to make any difference in performance. See e.g., Texas Instruments, "Further Details on Codebook-Based Pre-coding for E-UTRA," 3GPP TSG RAN WG1 #47bis, January 2007, R1-070270; S. Schwarz, M. Wrulich and M. Rupp, "Mutual Information based Calculation of the Precoding Matrix Indicator for 3GPP UMTS/LTE", International ITG Workshop on Smart Antennas, February 2010 (hereinafter "Schwarz"); D. J. Love and R. W. Heath, Jr., "Limited Feedback Unitary Precoding for Spatial Multiplexing System," IEEE Trans. IT-51, No. 8, 2005; Ericsson, "System-level evaluation of OFDM—further considerations," 3GPP TSG RAN WG1 #35, November 2003, R1031303. The MSE-based metrics require the calculation of matrix inversion, and the MI-based metrics require the calculation of matrix determinant. In either case, the metrics and hence the matrix operation is carried out on each and every selected resource element (RE) in the bandwidth of a subframe and the final metrics is the mean of those calculated on all the selected REs. It was noted in Schwarz that the computation effort can be prohibitively large if the number of REs becomes large, e.g., in the case of large system bandwidth and wideband report. Accordingly, Schwarz proposed the idea of combining a subset of REs into one RE. The combination is done by averaging channels of the REs in the subset and using the mean channel matrix to calculate a single metrics for the subset. However, due to the time and frequency varying nature of the channel, the size of the subset must be small to reduce the performance loss caused by the channel averaging and therefore complexity reduction of this approach can be very limited.

BRIEF DESCRIPTION OF THE DRAWINGS

The description of the various exemplary embodiments is explained in conjunction with the appended drawings, in which:

FIG. 2 illustrates a table of exemplary transmission modes available in LTE.

FIG. 3 illustrates an exemplary CQI table for LTE.

FIGS. 4 and 5 illustrate exemplary codebooks for LTE.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In accordance with the various exemplary embodiments, there is provided a computationally efficient method, computer program, device and system for implementing channel state information (CSI) measurement and reporting, such as in a network environment which supports LTE. In LTE, the CSI includes a channel rank indicator (RI), precoding matrix index (PMI) and channel quality indicator (CQI) and may include other information. The disclosure presents exemplary approaches to determine channel state information using the estimation of a channel covariance matrix and the approximation of its inversion. For example, the RI, PMI or CQI can be determined based on channel covariance estimation and the Taylor series approximation of its inverse. The estimation of RI and PMI can be decoupled and the PMI estimation can be simplified to implement only one matrix inversion per PMI trial. The PMI estimation may involve the use of mean channel covariance. A CQI estimator also is provided that is based on Channel Covariance Effective SNR Mapping (CCESM) which can be implemented with only one matrix inversion per CQI calculation and without any non-linear function evaluations. Various compensation factors can be used to calibrate or compensate the estimation of the various channel state information to approximate or match desired results, such as to approximate joint RI-PMI estimation results. The compensation factors can be determined based on simulations. These and other exemplary aspects in the disclosure provide, among other things, a reduction in the complexity of the hardware (HW) and/or software (SW) implementations with respect to channel state information, and are discussed in greater detail below with reference to the Figures.

Figure 1:
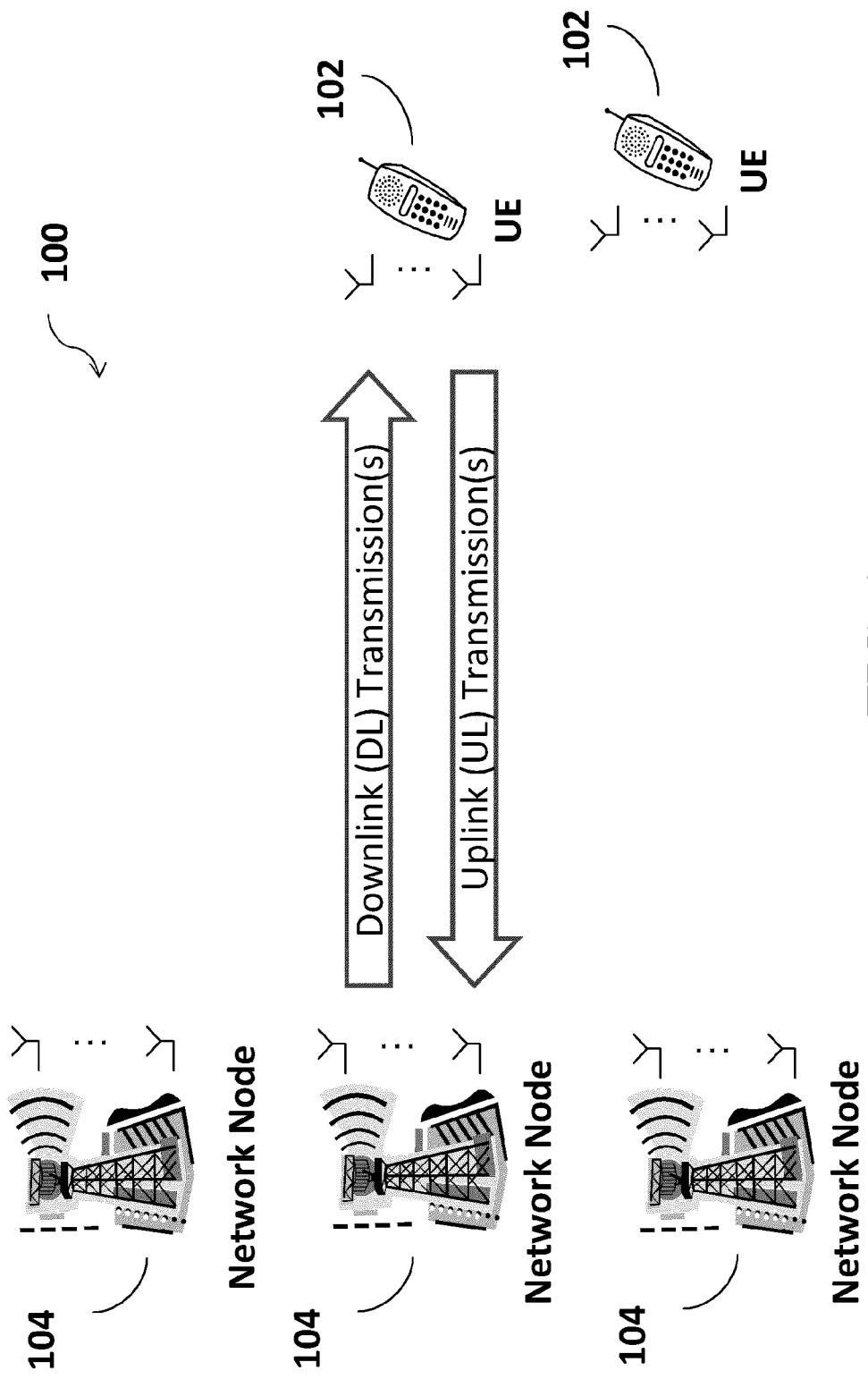
FIG. 1 illustrates an exemplary wireless network environment in accordance with an embodiment.

FIG. 1 illustrates an exemplary wireless network environment 100. As shown, the network environment 100 includes one or more user equipment (UE) 102 and one or more network nodes 104 of a wireless network. The network node 104 can be an enhanced or evolved Node B (eNodeB or eNB), access node or point, base station or other network element that facilitates communications with UEs through the wireless network. The UE can be a fixed or mobile device that is able to conduct wireless or radio-based communications. For the purposes of discussion, the wireless network environment supports implementation of LTE (Long Term Evolution), such as according to specifications set forth in the documents: 3GPP, "LTE Physical Layer Procedures," ETSI TS 136 213, V8.7.0, June 2009 and 3GPP, "LTE Physical Channels and Modulation," ETSI TS 136 211, V8.7.0, June 2009, which are incorporated herein by reference in their entirety. The wireless network environment 100 supports various communications modes, including for example, single-antenna mode, transmit diversity (TxD) mode, spatial multiplexing (SM) mode, multiple-in-multiple-out (MIMO) mode, and so forth. An exemplary listing of these and other communication modes, as set forth in the LTE specification, is provided in the table shown in FIG. 2.

In LTE, the UE provides or reports various information, including channel state information, to the wireless network such as to its network nodes. As described above, the channel state information includes RI (Rank Indicator or Index), PMI (Precoding Matrix Indicator or Index), and CQI (Channel Quality Indicator or Index) and other information.

The CQI provides the network node with information concerning link adaptation parameters supportable by the UE at the time, and may take into account various factors such as the transmission mode, UE receiver type, number of antennas, interference, or other desired factors. An index of CQIs may be defined, for example in a table, which sets forth a plurality of Modulation and Coding Schemes (MCSs) and transport block sizes (TBSs). An example of a 4-bit CQI table as set forth in the LTE specification is provided in FIG. 3. The CQI table in FIG. 3 defines a modulation, code rate and efficiency per CQI index. The UE reports back to the network node with the highest CQI index. The highest CQI index can correspond to the MCS and TBS for which the estimated received downlink (DL) transport block BLER (block error rate) does not exceed a defined percentage, such as for example 10% or 0.10.

The rank indicator (RI) is the UE's recommendation for the number of layers. In LTE, this is used in the spatial multiplexing (SM) mode. For example, the RI is reported when the UE is operating in Multiple-In-Multiple-Out (MIMO) modes with spatial multiplexing. By way of example, the RI can have values 1 or 2 with 2-by-2 antenna configuration and from 1 up to 4 with 4-by-4 antenna configuration. The RI is associated with one or more CQI reports. For example, the reported CQI is calculated assuming a particular RI value. The RI describes the channel rank on the whole system band or on certain subband, and may also be reported to the network.

The PMI provides information about the preferred precoding matrix in codebook based precoding. Similar to the RI, the PMI is also relevant to MIMO operation. MIMO operation with PMI feedback is referred to as Closed Loop MIMO. The PMI feedback may be limited to specific transmission modes. The number of precoding matrices in the codebook depends on the number of network node antenna ports, e.g., eNB antenna ports. For example, in the case of two antenna ports, there can be altogether six matrices to choose from, while with four antenna ports the total number can go up to 64 depending on the RI and the UE capability. The PMI reporting can be either wideband or frequency selective depending on the CSI feedback mode.

The UE may communicate information, such as channel state information and payload, through common (or shared) uplink channel(s) or dedicated uplink channel(s). For example, in LTE, there is a Physical Uplink Control Channel (PUCCH) that primarily carries control information, and a Physical Uplink Shared Channel (PUSCH) that is a dedicated channel. Two types of reports are supported in LTE, namely periodic and aperiodic reports. Periodic reporting using PUCCH is the baseline mode for channel information feedback reporting. The network node, e.g., eNB, configures the periodicity parameters and the PUCCH resources via higher layer signalling. Periodic channels are normally transmitted on the PUCCH. If the UE is scheduled in the uplink, the periodic report is moved to the PUSCH. The reporting period of RI can be a multiple of CQI/PMI reporting periodicity. RI reports may use the same PUCCH resource (e.g., PRB, Cyclic shift) as the CQI/PMI reports—PUCCH format.

When the network node requires more precise channel state feedback information, it can request, at any desired time, that the UE sends an aperiodic channel state feedback report, such as on PUSCH. These reports can be either sent along with data or sent alone on PUSCH. When the transmission of periodic and aperiodic reports from the same UE may collide, the UE can be configured to send only the aperiodic report.

To determine the channel state information, such as RI, PMI and CQI, the calculation of the RI and the PMI are decoupled in accordance with an exemplary embodiment. The PMI is calculated using the channel covariance, which is averaged over the whole bandwidth to be configured to report on. In comparison to the joint RI-PMI estimation approach, the computation burden is decreased by reducing the matrix operation (inverse or determinant) for example to one per precoding matrix trial. There is a fundamental difference between the channel averaging and the channel covariance averaging because the channel covariance (which reflects the channel spatial correlation property) can be assumed to be more constant than channel itself over the bandwidth in one subframe.

Furthermore, the CQI is a measure of the effective SINR (eSINR) of the instantaneous channel with which the same error rate or capacity performance can be achieved by an equivalent AWGN channel. The effective SINR is generally produced by the effective SINR mapping (ESM), which combines and maps the individual SINR estimates at every RE to a single eSINR. The exponential ESM (EESM) and the mutual information ESM (MIESM) are ESM methods that are used in the prediction of link level performance. See e.g., Ericsson, "System-level evaluation of OFDM—further considerations," 3GPP TSG RAN WG1 #35, November 2003, R1031303; K. Sayana, J. Zhuang and K. Stewart, "Short Term Link Performance Modeling for ML Receivers with Mutual Information per Bit Metrics," IEEE GlobeComm 2008, pp. 1-6. In either method, the individual per-RE SINRs are first calculated and then mapped by a non-linear function (exponential or Bessel functions) to the range of [0, 1], combined/averaged and finally inversely mapped back to a single eSINR. Like PMI, the SINR calculation at each RE uses a matrix inversion. The size of the matrix can be up to the number of transmit antennas at eNB and the computation is intensive. The evaluation of the non-linear function on each RE can also be a challenge for hardware (HW) and software (SW) implementations.

Accordingly, to reduce the complexity in the CQI computation, the CQI is determined using a channel covariance based ESM method (CCESM), where the mapping/combining is linearized by the averaging of the mean-square-errors (MSEs) at every RE, in accordance with an exemplary embodiment. The calculation of the MSE is simplified by a single matrix inversion plus a compensation item (or factor) on each RE. The matrix is formed by the mean channel covariance matrix and its inversion can be implemented only once per CQI calculation. The compensation item is from a second-order or higher-order Taylor approximation of the matrix inversion and can be performed with only matrix multiplication operations. No non-linear function is needed in the CCESM. This exemplary simplified approach for determining CQI can be used irrespective of how RI and PMI are determined, e.g., whether using decoupled RI-PMI estimation or joint RI-PMI estimation.

Figure 6:
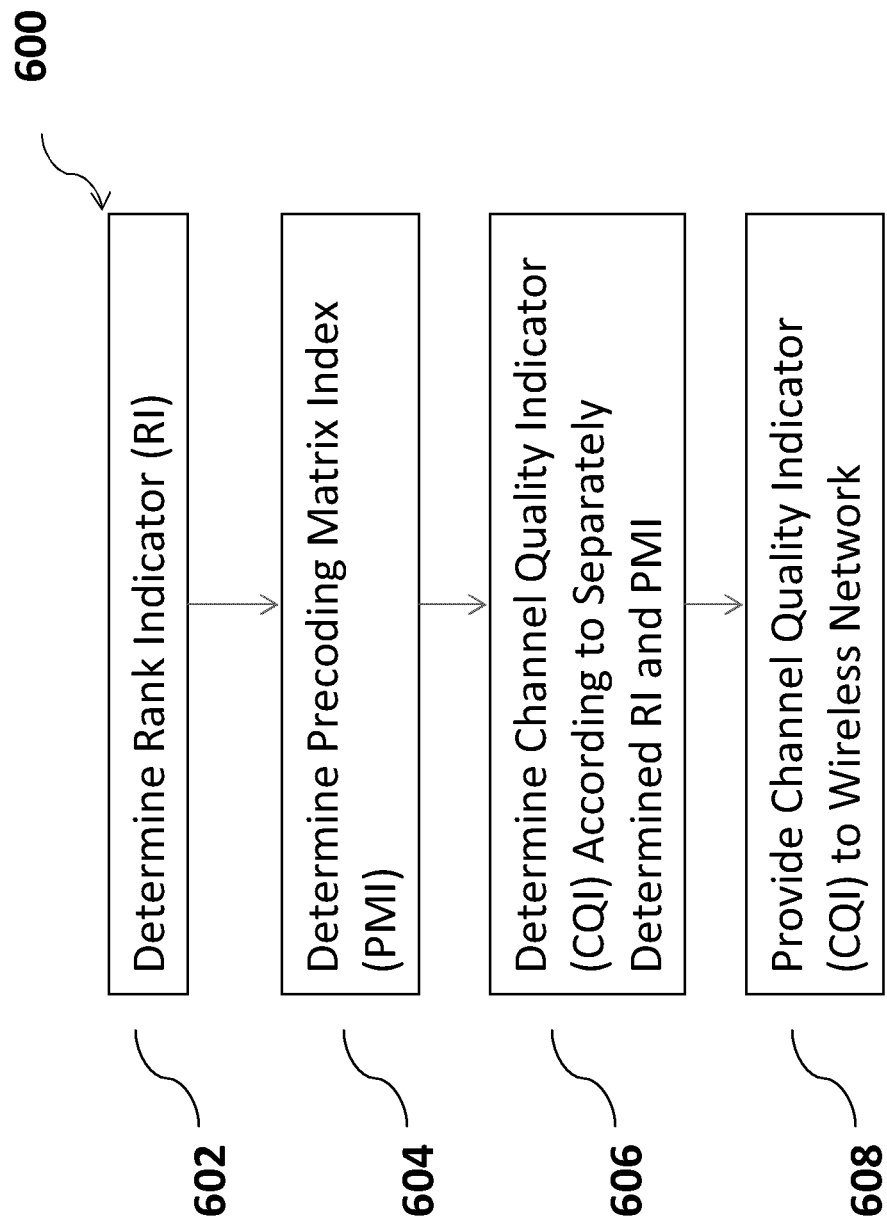
FIG. 6 illustrates a flow diagram for an exemplary method or process to determine and report CQI, in accordance with an embodiment.

FIG. 6 illustrates an exemplary process 600 for determining and reporting the CQI, which can be implemented by a UE. For example, the RI is determined at step 602. The determination of the RI may involve the use of covariance channel estimation. For example, a channel rank estimator (or RI estimator) may be used which is based on the eigenvalue decomposition of the channel covariance matrix and a combination of thresholds, such as relative eigenvalue thresholds and relaxed input SNR thresholds. These thresholds can be used to calibrate or optimize the RI determination, such that for example to make channel rank estimation consistent with that of the joint RI-PMI estimation approach, etc.

In step 604, the PMI is determined. For example, a PMI estimator can be used which is based on the mean channel covariance and the Taylor series approximation of its inverse. The Taylor series approximation can be a zero-th order or higher order approximation. The PMI estimation can be implemented with only one matrix inversion per PMI trial.

In step 606, the CQI is then determined according to the RI and PMI. For example, in the spatial multiplexing (SM) mode, a CQI estimator is used which is based on the CCESM which may be implemented with only one matrix inversion per CQI for the channel covariance matrix and three matrix multiplications per RE for the second order approximation of the inversion. A compensation factor or the like can be used to optimize the performance. For transmit diversity mode, the Noise-power Average ESM (NAESM) based CQI estimator can be used as an alternative. These simplified estimators can be implemented without using any non-linear functions for the ESM. Further, the CQI estimator can be used in combination with any suitable approach for determining RI and PMI, such as for example decoupled RI-PMI estimation or joint RI-PMI estimation as described in this disclosure.

In step 606, the CQI is provided or reported to the wireless network, such as the network node. The network node receives the channel quality indicator (CQI) from a user equipment, and controlling communications for the wireless network based on the received CQI. For example, the network node may use the CQI report to assist in the selection or optimization of communication parameters, such as selecting from available transport block sizes, resource allocations and modulation schemes or a permissible combination thereof. This selection may for example involve sacrificing capacity to achieve a lower error rate, or vice-a-versa.

Figure 7:
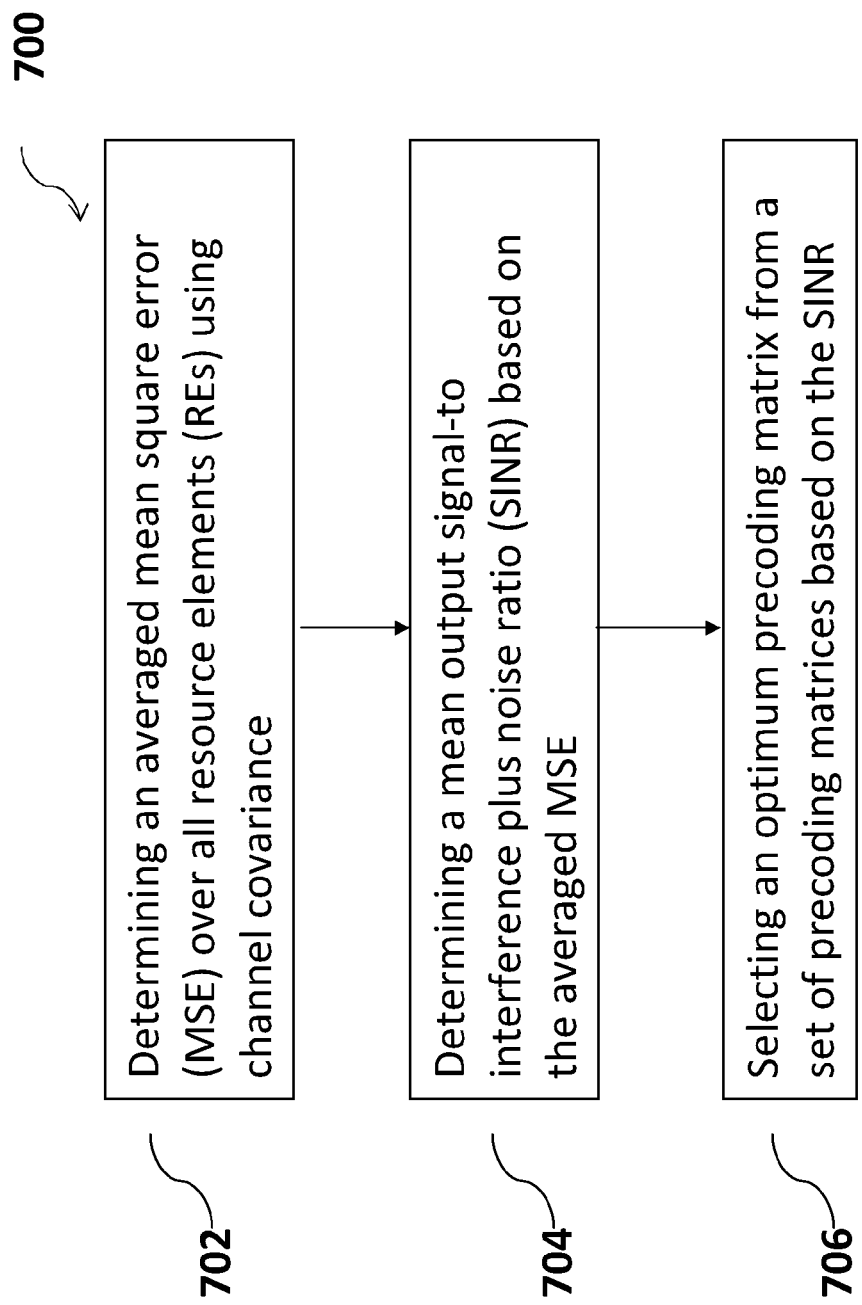
FIG. 7 illustrates a flow diagram for an exemplary method or process to determine PMI, in accordance with an embodiment.

FIG. 7 illustrates an exemplary process 700 for determining the PMI, which can be implemented by a UE. For example, in step 702, an averaged mean square error (MSE) is determined over all resource elements (REs) using channel covariance, e.g., the mean channel covariance, and the Taylor series approximation (e.g., zero-th or higher order) of its inverse. In step 704, a mean output signal-to-interference plus noise ratio (SINR) is determined based on the averaged MSE. In Step 706, an optimum precoding matrix is selected from a set of precoding matrices based on the determined SINR.

Figure 8:
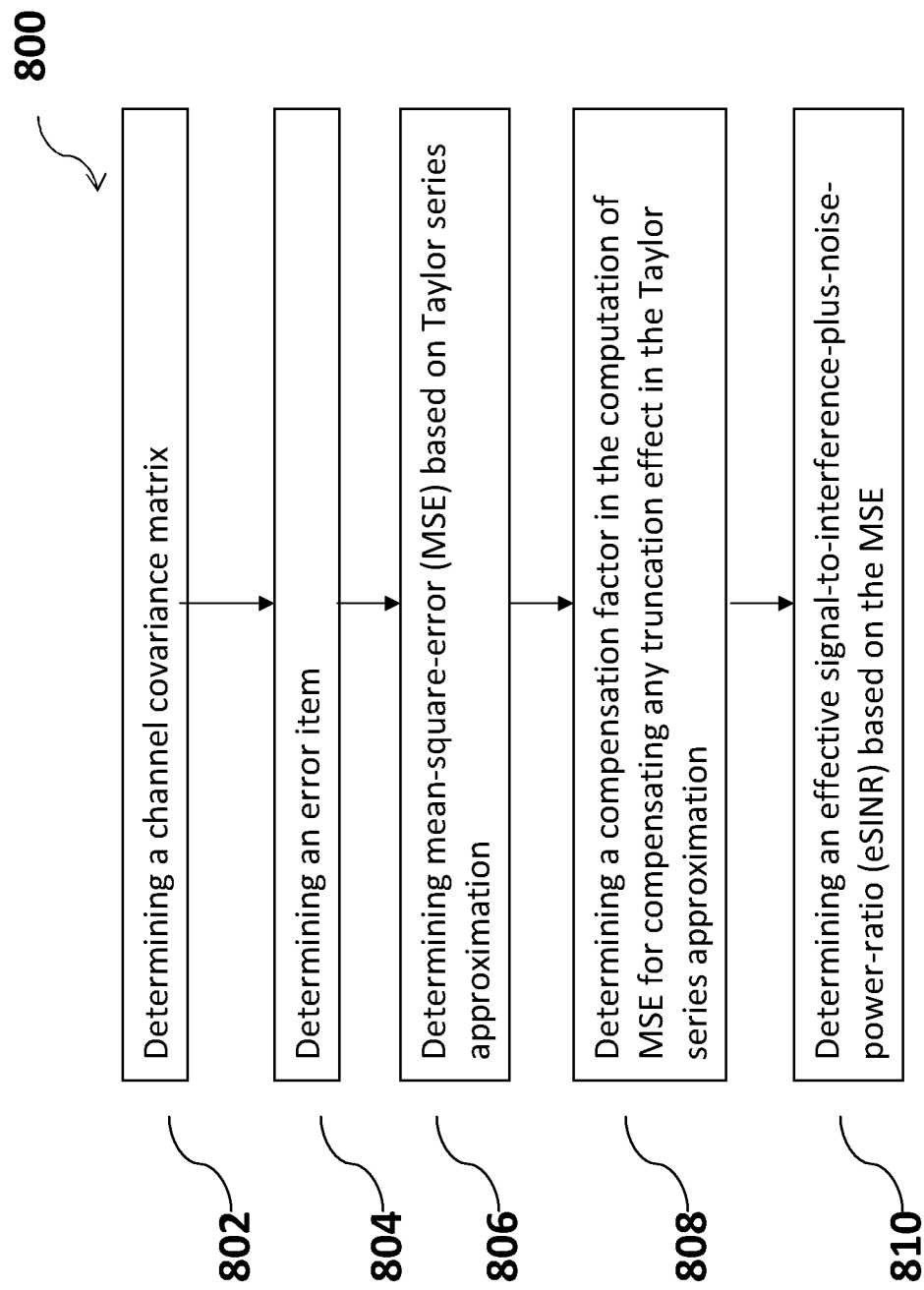
FIG. 8 illustrates a flow diagram for an exemplary method or process to determine CQI based on channel covariance effective SNR mapping (CCESM), in accordance with an embodiment.

FIG. 8 illustrates an exemplary process 800 for determining the CQI based on channel covariance effective SNR mapping (CCESM). The process 800 can be implemented by a UE. For example, in step 802, a channel covariance matrix is determined. In step 804, an error item is determined. The error item can be the difference between an instant channel correlation at a particular resource element (e.g., element k) and an averaged channel covariance matrix. In step 806, the mean-squared error (MSE) is determined using the channel covariance matrix and error item based on Taylor series approximation. The approximation may include or truncate higher orders of the Taylor series approximation. In Step 808, a compensation factor may be determined in computing the MSE. The compensation factor may be used to compensate for any truncation effect in the Taylor series approximation. In Step 810, an effective signal-to-interference plus noise power ratio (eSINR) is determined based on the MSE.

The above-noted processes and operations with reference to FIGS. 6-8 may be performed in different order, may include or not include all the steps or operations, and may be implemented at predetermined times or upon a request such as from the wireless network (or its network node), e.g., periodically or aperiodically. Further, one or more of the channel state information, e.g., RI, PMI and/or CQI, may be provided or reported to the wireless network (or its network node) at predetermined times or upon a request such as from the network, e.g., periodical or aperiodical report.

Provided below are detailed examples of various approaches to determine the RI, PMI and CQI in accordance with the exemplary embodiments in this disclosure. Although RI, PMI and CQI are discussed with reference to LTE, the methodologies and processes in this disclosure may be employed with any wireless protocol or network, or precoding scheme that uses RI, PMI and/or CQI, or similar channel state information.

RI Estimation

As discussed above, the rank indicator estimation is decoupled from the PMI estimation in accordance with various exemplary embodiments. This decoupling is, for example, based on the observation that the system throughput performance is not sensitive to the rank estimation so long as the rank of the channel is not consistently overestimated. It is further validated by the RI estimator where some thresholds can be tuned by simulations such that the difference from that of the joint RI-PMI estimation is reduced or minimized.

For example, let $H_k$ be the MIMO channel matrix (estimated) at the k-th RE in a UE receiver. Then $$H_k = \begin{bmatrix} h_{11}(k) & \cdots & h_{1N}(k) \\ \vdots & \ddots & \vdots \\ h_{M1}(k) & \cdots & h_{MN}(k) \end{bmatrix}, \quad (1)$$

where M and N are respectively the number of receive antennas in UE and the number of transmit antennas in eNB. The channel covariance matrix can be defined by:

$$R_H = E\{H_k^H H_k\}, \quad (2)$$

where H denotes conjugate transpose and E is the expectation which can be implemented by the mean over the REs. For the purpose of rank estimation, equation (2) is used when M≥N and $$R_H = E\{H_k H_k^H\} \quad (3)$$

is used when M<N. This is to minimize the cost of eigenvalue decomposition followed without affecting the rank estimation. $R_H$ is a positive definite Hermitian matrix, and has the eigenvalue decomposition:

$$R_H = VDV^H, \quad (4)$$

where V is the eigenvector matrix and D=diag $\{d_1, d_2, \ldots d_{N_d}\}$ contains the eigenvalues $d_k$. $N_d$=min {M, N}.

A method for rank estimation is to find a threshold based on the input noise power estimation (or the equivalent input SNR estimation). The rank of the channel is the number of eigenvalues that are greater than the threshold. This method was proposed and analyzed in the article by Victor T. Ermolayev, A. G. Flaksman and E. A. Mavrichev, "Estimation of Channel Matrix Rank for Multielement Antenna Array Working in Multipath Fading Environment," IEEE International Conference on Circuits and Systems for Communications, 2002, pp. 416-419. It was found however that a single noise power based threshold is difficult to establish in order to control the overestimation and the performance loss from the joint RI-PMI estimator.

Accordingly, the following alternative method may be used to better meet requirements, in accordance with an embodiment. For example, if snr is the input (before equalization) signal-to-noise-ratio (SNR) estimate at the UE receiver, then RI-1. If snr<snrThresR1 or $N_d$=1, then the rank estimation of the channel RI=1, where snrThresR1 is the first SNR threshold for very low SNR situations. snrThresR1 can be determined by simulations. For example, it was found that snrThresR1=0.67 (in linear unit, or −1.76 in dB) is a suitable choice for the LTE applications.

RI-2. Otherwise, if snr<snrThresEig then eigThes=eigThresHi; else eigThes=eigThresLo, where snrThresEig is the second SNR threshold for mid to high SNR situations. The threshold eigThes is a gauge of the ratio of an eigenvalue to the largest one of the channel.

The rank estimation of the channel is the number of eigenvalues that are greater than ($d_{max}$*eigThres). The thresholds, e.g., snrThresEig, eigThresHi and eigThresLo, can be determined by simulations. For example, it was found that the suitable choices are snrThresEig=2 (in linear unit, or 3 in dB), eigThresHi=0.7, eigThresLo=0.6. The term $d_{max}$ is the maximum of the eigenvalues in $\{d_1, d_2, \ldots d_{N_d}\}$.

In this example, the use of SNR does not require any up-front normalization of received samples and, thus, provides a simple approach.

In another alternative approach, the multiple noise power thresholds can be used. An example is provided as follows:

RI-1*. If pn>pnThresR1 or $N_d$=1, then the rank estimation of the channel RI=1, where pn is the input noise power estimation assuming that the signal power is normalized (unity); and pnThresR1 is the noise power threshold for very low SNR situations. pnThresR1 can be determined by simulations. For example, it was found that pnThresR1=1.5 (in linear unit) is a suitable choice.

RI-2*. Otherwise, if pit>pnThresEig then eigThes=eigThresHi; else eigThes=eigThresLo. The rank estimation of the channel is the number of eigenvalues that are greater than ($d_{max}$*eigThres). The thresholds, pnThresEig, eigThresHi and eigThresLo can be determined by simulations. For example, it was found that the suitable choices are pnThresEig=0.5, eigThresHi=0.7, eigThresLo=0.6. The term $d_{max}$ is the maximum of the eigenvalues in $\{d_1, d_2, \ldots d_{N_d}\}$.

PMI Estimation

An example of a simplified PMI estimator (or methodology) is described below in accordance with an exemplary embodiment. This section begins with an explanation of the complexities of PMI estimation, and then follows with an explanation of the simplified approach.

For an MMSE (Minimized Mean Squared Error) linear receiver, the output MSE at the k-th resource element (RE) is $$\varepsilon_k = \mathrm{diag}\{(I_N + cH_{ek}^H H_{ek})^{-1}\}, \quad (5)$$

where $$c = \frac{1}{pn}$$

is the input SNR with normalized input signal power and input noise power pn; $I_N$ is an N×N identity matrix; and $H_{ek}$ is the effective channel that includes the precoding processing and the propagation channel $H_k$ in equation (1). For a closed-loop spatial multiplexing (SM) mode where the PMI estimation is concerned, the effective channel can be written as $$H_{ek} = H_k W. \quad (6)$$

where W is a precoding matrix from the predefined codebook (e.g., LTE codebook tables shown in FIGS. 4 and 5) indicated by the rank of the channel (RI) and the precoding matrix index (PMI) within the RI. It is noted that equation (5) contains the MSE for each layer, that is $$\epsilon_k = [\epsilon_{k,1}, \epsilon_{k,2}, \ldots, \epsilon_{k,RE}]^T. \quad (7)$$

The output signal to interference plus noise ratio (SINR) at the k-th RE and on the i-th layer can be shown to be $$\eta_{k,i} = \frac{1}{\varepsilon_{k,i}} - 1. \quad (8)$$

(see e.g., A. Paulraj, R. Nabar and D. Gore, "Introduction to Space-Time Wireless Communications," Cambridge University Press 2003). The optimum PMI corresponds to the precoding matrix that maximizes the mean SINR's of all layers, that is $$W_{opt} = \underset{W}{\mathrm{argmax}} \left\{ E \sum_{i=1}^{RI} \eta_{k,i} \right\} = \underset{W}{\mathrm{argmax}} \{f_c(W)\}. \quad (9)$$

The expectation is taken over all the selected REs. It can be seen that the evaluation of $f_c(W)$ needs the calculation of each $\varepsilon_k$ at the k-th RE, which in turn requires the calculation of a matrix inversion at each RE as shown in equation (5).

To reduce the complexity of the PMI estimation, the expectation is first taken on the channel covariance in equation (5). For example, let $$R_{He} = \varepsilon\{H_{ek}^H H_{ek}\} = W^H R_H W, \quad (10)$$

where $R_H$ is channel covariance defined in equation (2). Then, the averaged MSE of equation (5) over all REs can be approximated by:

$$\varepsilon = \mathrm{diag}\{(I_N + cR_{He})^{-1}\} = [\varepsilon_1, \varepsilon_2, \ldots, \varepsilon_{RI}]^T. \quad (11)$$

The mean output SINR becomes:

$$\eta_i = \frac{1}{\varepsilon_i} - 1. \quad (12)$$

Accordingly, an optimum PMI can be obtained by selecting the corresponding precoding matrix that maximizes the sum of the SINRs of all layers, that is:

$$W_{opt} = \underset{W}{\mathrm{argmax}} \left\{ \sum_{i=1}^{RI} \eta_i \right\} = \underset{W}{\mathrm{argmax}} \{f_s(W)\}. \quad (13)$$

In this example, the evaluation of $f_s(W)$ uses the matrix inversion of equation (11) only once per W trial due to equation (10).

Figure 9:
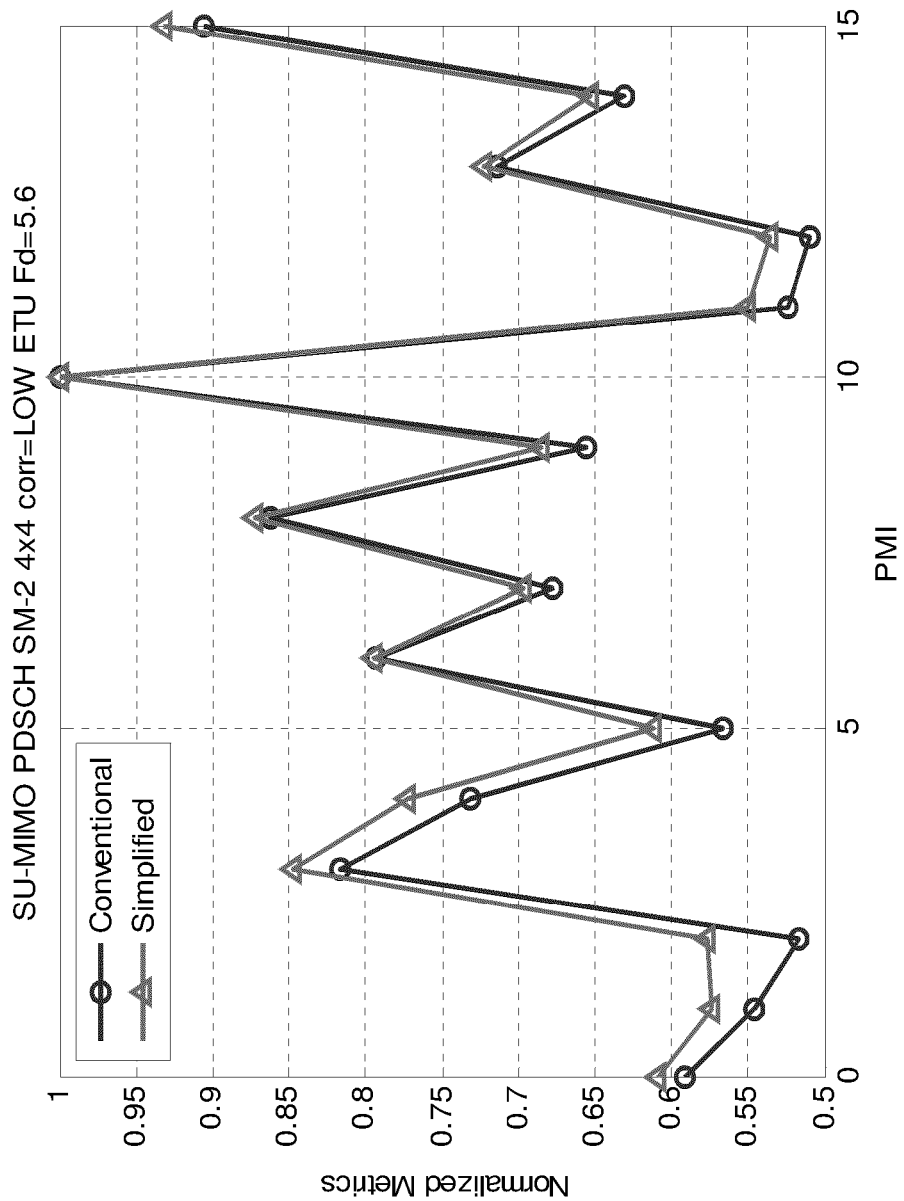
FIG. 9 illustrates a graph of exemplary normalized metrics profiles of conventional and simplified approaches for optimum PMI selection for spatial multiplexing mode with RI=2 (layers), and N=M=4 (antennas), in accordance with an embodiment.

FIG. 9 illustrates a graph of exemplary metrics profile of the simplified $f_s(W)$ in equation (13) and of the conventional $f_c(W)$ in equation (9) for each W in the codebook. As shown, the metric profile of $f_s(W)$ in equation (13) closely follows that of $f_c(W)$ in equation (9). The graph is based on results of a simulation of spatial multiplexing mode with RI=2 (layers) and N=M=4 (antennas), and reflect that the two approaches yield virtually or approximately the same optimum PMIs.

Although the PMI estimator and methodology is discussed with reference to LTE, they may be used with any suitable communications protocol or network that employs a precoder. Further, although the PMI estimator is derived with reference to an MMSE linear receiver, it can be used in any other kind of receivers, e.g., the maximum-likelihood based receivers.

CQI Estimation

An example of a simplified CQI estimator (or methodology) is described below in accordance with an exemplary embodiment. The simplified CQI estimator follows a similar path to the simplified PMI estimator. It starts with the Taylor expansion and the approximation of equation (5). For purposes of discussion, if X is invertible and ΔX is small enough then the Taylor expansion is:

$$(X + \Delta X)^{-1} = \sum_{i=0}^{\infty} (-1)^i (X^{-1} \Delta X)^i X^{-1}$$

$$= X^{-1} - X^{-1} \Delta X X^{-1} + X^{-1} \Delta X X^{-1} \Delta X X^{-1} - \ldots$$

With respect to the simplified CQI estimator, let $$R_{ek} = I_N + cH_{ek}^H H_{ek},$$

$$R_e = E\{R_{ek}\} = I_N + cR_{He} \text{ and}$$

$$\Delta R_{ek} = R_{ek} - R_e, \quad (14)$$

where $$c = \frac{1}{pn}$$

is the input SNR assuming normalized signal power. The term pn is the input noise power. The error item $\Delta R_{ek}$ is the difference between the instant channel correlation at resource element k and the averaged channel covariance matrix. The $I_N$ is an N by N identity matrix. The averaged MSE of equation (5) over all REs can be rewritten as $$\varepsilon = E\{e_k\} \quad (15)$$

$$= \mathrm{diag}\{E\{R_{ek}^{-1}\}\}$$

$$= \mathrm{diag}\{E\{(R_e + \Delta R_{ek})^{-1}\}\}$$

$$\approx \mathrm{diag}\{R_e^{-1} + \gamma R_e^{-1} E\{\Delta R_{ek} R_e^{-1} \Delta R_{ek}\} R_e^{-1}\},$$

where the second order approximation of equation (5) is used and assuming that $\Delta R_{ek}$ of zero-mean. The term $\gamma$ is a compensation factor for the omitted higher order terms. Based on simulations, it was found that $\gamma=1.8$ is an example of a desirable value for the compensation factor. It is noted that equation (11) can be seen as the zero-th order approximation of equation (15). The second order term is used for the effective SINR (eSINR) adjustment because the variance (due to frequency selectivity) of the individual per-RE SINR, which is related to second order moment of $\Delta R_{ek}$, affects the output of the Turbo decoder and hence the block error rate (BLER). Although the above describes an example using a second order approximation, higher orders of approximation, including for example 4th-order approximation, 6th-order, . . . 2*n-th order (where n> or =1) can be used for potential improvement in estimation accuracy.

The computation of equation (15) uses one matrix inversion, $R_e^{-1}$ for all. It may use some extra storage for $\Delta R_{ek}$ or $R_{ek}$ and three more matrix multiplications at every RE.

To compute the eSINRs for the codewords in the spatial multiplexing (SM) mode in LTE (see e.g., 3GPP, "LTE Physical Channels and Modulation," ETSI TS 136 211, V8.7.0, June 2009), the following cases are considered.

SM-1. For 1-layer SM (RI=1), (15) becomes a scalar, $\epsilon=\epsilon_1$. The eSINR for the single codeword is $$eSINR = \frac{1}{\varepsilon_1} - 1$$

SM-2. For 2-layer SM (RI=2), $\epsilon=[\epsilon_1, \epsilon_2]^T$ from (15) and the eSINR's for the two codewords are $$eSINR_1 = \frac{1}{\varepsilon_1} - 1, \, eSINR_2 = \frac{1}{\varepsilon_2} - 1$$

SM-3. For 3-layer SM (RI=3), $\epsilon=[\epsilon_1, \epsilon_2, \epsilon_3]^T$ and the eSINR's for the two codewords are $$eSINR_1 = \frac{1}{\varepsilon_1} - 1, \, eSINR_2 = \frac{2}{\varepsilon_1 + \varepsilon_2} - 1$$

SM-4. For 4-layer SM (RI=4), $\epsilon=[\epsilon_1, \epsilon_2, \epsilon_3, \epsilon_4]^T$ and the eSINR's for the two codewords are $$eSINR_1 = \frac{2}{\varepsilon_1 + \varepsilon_2} - 1, \, eSINR_2 = \frac{2}{\varepsilon_3 + \varepsilon_4} - 1$$

The above exemplary simplified effective SNR mapping is called Channel Covariance Effective SINR Mapping (CCESM) due to the fact that the mean channel covariance matrix and its inverse are used in the calculations.

For transmit diversity (TxD) mode, the effective channel covariance in equation (5) is degenerated to a diagonal matrix due to the channel self-orthogonalization nature of the Alamouti code. The matrix inversion becomes a scalar division, and the eSINR can be computed by the direct Noise-power Average ESM (NAESM) as described by the example below.

TDNA-1. For transmit diversity with two Tx antennas (N=2), the mean output noise power of a zero-forcing receiver is:

$$\varepsilon = E\left\{\frac{1}{cg_2(k)}\right\}, \tag{16}$$

where $$g_2(k) = \frac{1}{2} \sum_{i=1}^{M} \sum_{j=1}^{N} |h_{ij}(k)|^2. \tag{17}$$

$h_{ij}(k)$'s are given in equation (1) and the eSINR is:

$$eSINR = \frac{1}{\varepsilon}. \tag{18}$$

TDNA-2. For transmit diversity with four Tx antennas (N=4), the mean output noise power of a zero-forcing receiver is:

$$\varepsilon = \frac{1}{2} E\left\{\frac{1}{cg_{41}(k)} + \frac{1}{cg_{42}(k)}\right\}, \tag{19}$$

where $$g_{41}(k) = \frac{1}{2} \sum_{i=1}^{M} \sum_{j=1,3} |h_{ij}(k)|^2, \, g_{42}(k) = \frac{1}{2} \sum_{i=1}^{N} \sum_{j=2,4} |h_{ij}(k)|^2. \tag{20}$$

$h_{ij}(k)$'s are given in equation (1) and the eSINR is calculated by equation (18).

If the divisions in equations (16) and (19) compose a challenge for implementation, the CCESM can still be used to get rid of the per-RE divisions. The CCESM for a zero-force receiver in diversity mode can be similarly derived from equations (14) and (15) and the result is summarized below:

TDCC-1. For transmit diversity with two Tx antennas (N=2), the mean output noise power of a zero-forcing receiver is $$\varepsilon = \frac{1}{cg_2} + \gamma \frac{E\{(g_2(k) - g_2)^2\}}{cg_2^2} \tag{21}$$

where $g_2=E\{g_2(k)\}$. The term $g_2(k)$ is defined in equation (17) and the eSINR is calculated by equation (18).

TDCC-2. For transmit diversity with four Tx antennas (N=4), the mean output noise power of a zero-forcing receiver is $$\varepsilon = \frac{\varepsilon_1 + \varepsilon_2}{2}, \tag{22}$$

where $$\varepsilon_1 = \frac{1}{cg_{41}} + \gamma \frac{E\{(g_{41}(k) - g_{41})^2\}}{cg_{41}^2}, \tag{23}$$

$$\varepsilon_2 = \frac{1}{cg_{42}} + \gamma \frac{E\{(g_{42}(k) - g_{42})^2\}}{cg_{42}^2}$$

$g_{41}=E\{g_{41}(k)\}, g_{42}=E\{g_{42}(k)\}$. $g_{41}(k)$ and $g_{42}(k)$ are given in (20) and the eSINR is calculated by equation (18).

Figure 10:
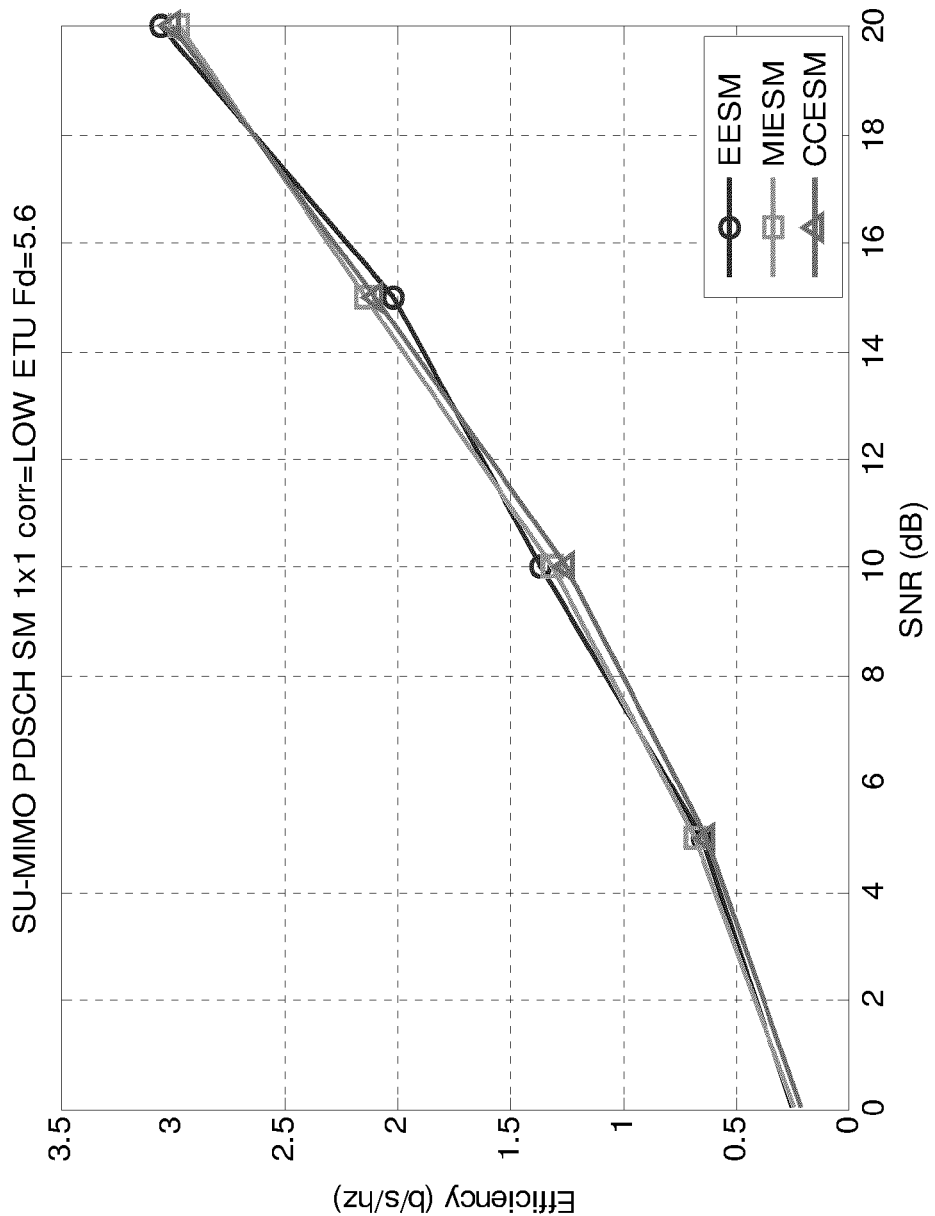
FIG. 10 illustrates a graph of an exemplary performance comparison of the simple and conventional CQI estimators for spatial multiplexing mode with Tx antenna N=1 and Rx antenna M=1, in accordance with an embodiment.
Figure 11:
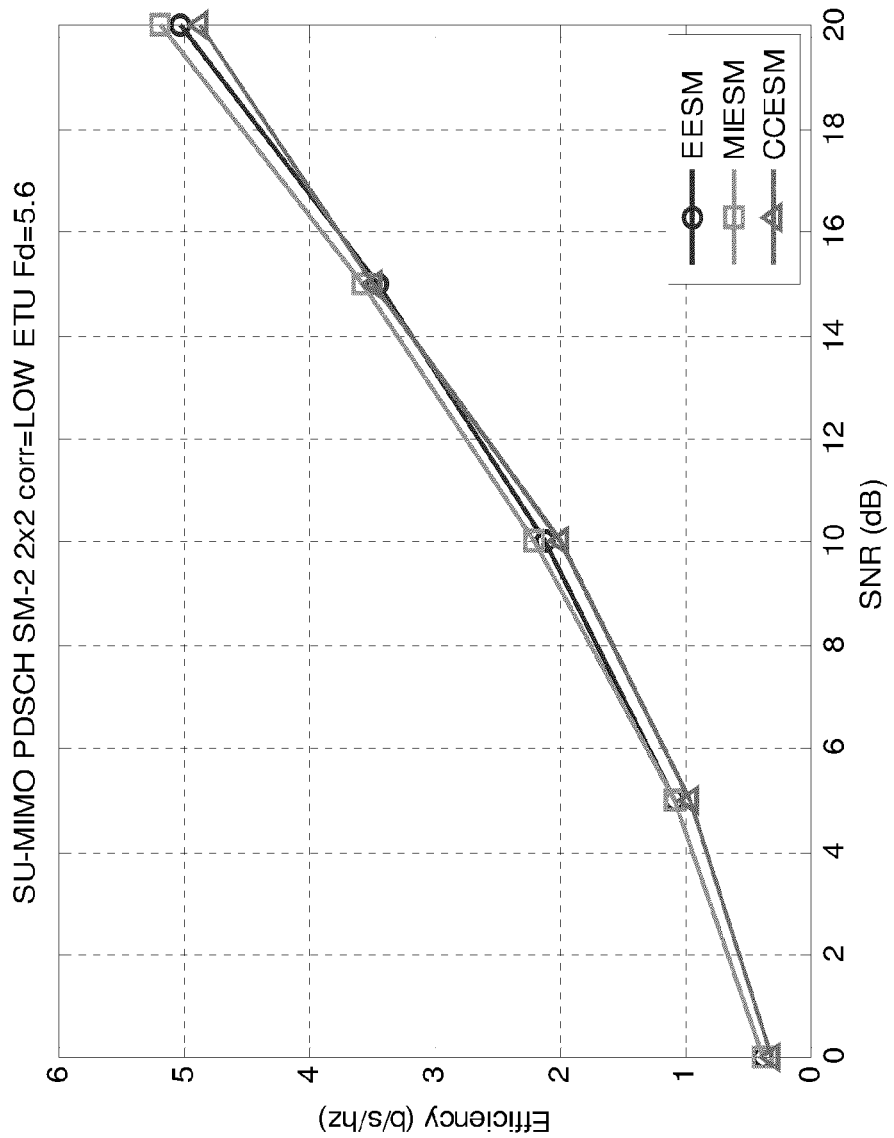
FIG. 11 illustrates a graph of an exemplary performance comparison of the simple and conventional CQI estimators for spatial multiplexing mode with 2 layers (RI=2), Tx antenna N=2 and Rx antenna M=2, in accordance with an embodiment.
Figure 12:
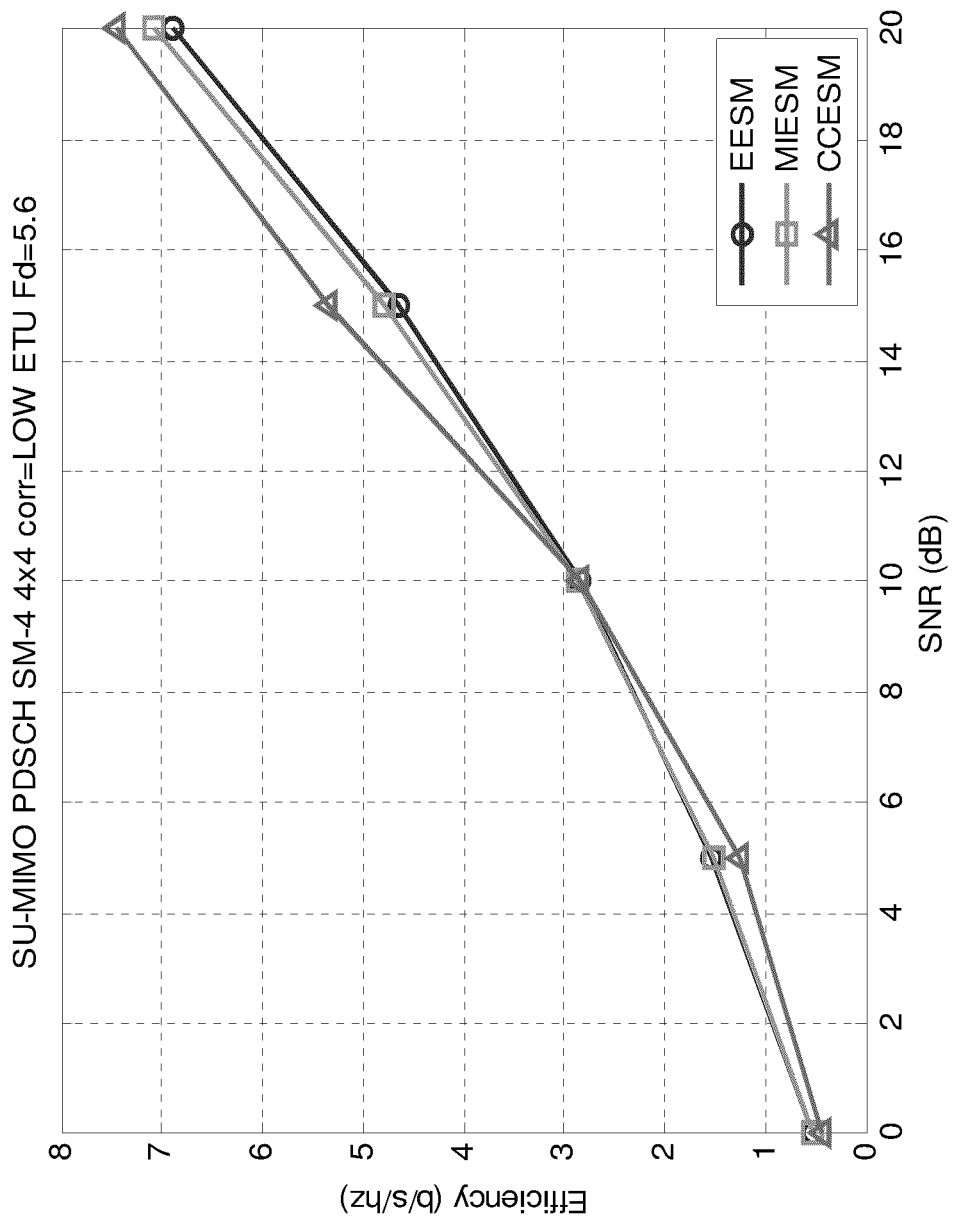
FIG. 12 illustrates a graph of an exemplary performance comparison of the simple and conventional CQI estimators for spatial multiplexing (SM) mode with 4 layers (RI=4). Tx antenna N=4, and Rx antenna M=4, in accordance with an embodiment.
Figure 13:
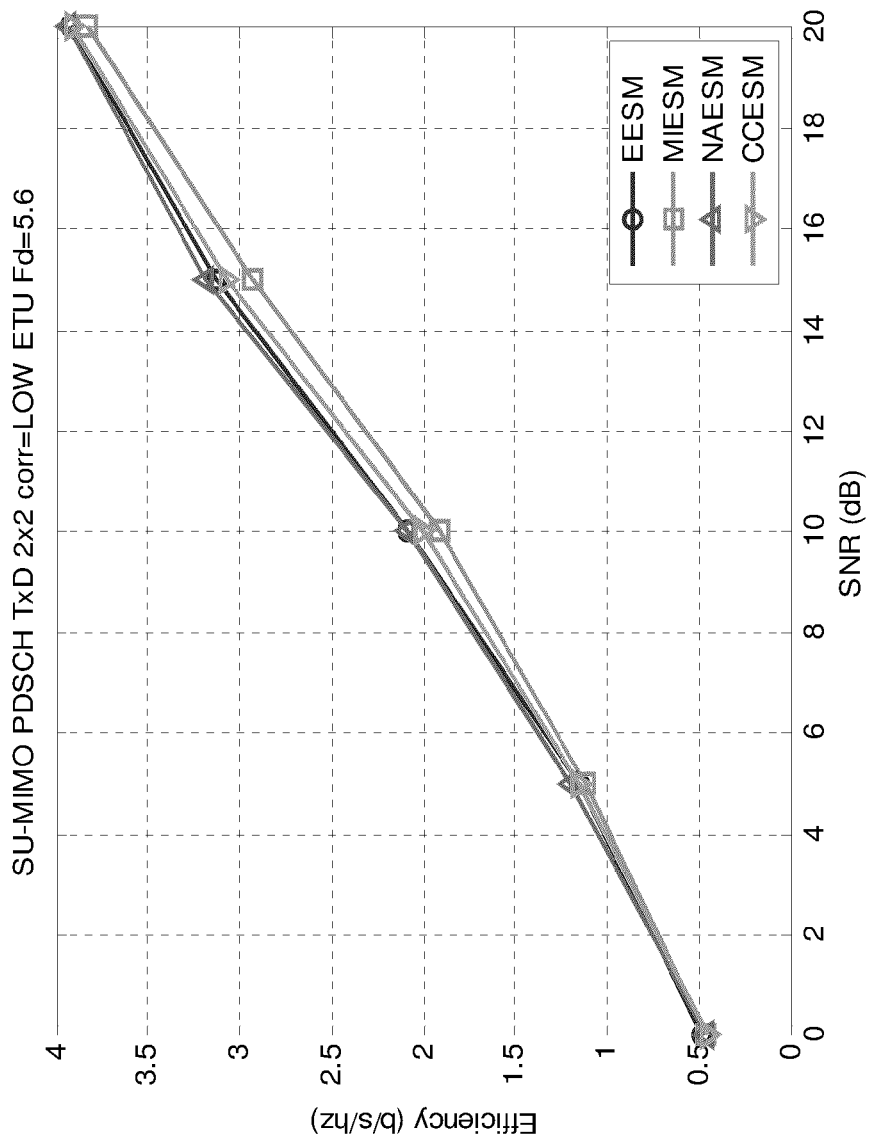
FIG. 13 illustrates a graph of an exemplary performance comparison of the simple and conventional CQI estimators for transmit diversity mode with Tx antenna N=2, and Rx antenna M=2, in accordance with an embodiment.

FIGS. 10-13 illustrate exemplary results of simulations of the CQI estimator based on CCESM (SM mode) or NAESM (TxD mode). The results based on EESM and MIESM are also shown for the purposes of comparison. For example, FIG. 10 illustrates a graph of an exemplary performance comparison of the simple and conventional CQI estimators for spatial multiplexing mode with Tx antenna N=1 and Rx antenna M=1, in accordance with an embodiment. FIG. 11 illustrates a graph of an exemplary performance comparison of the simple and the conventional CQI estimators for spatial multiplexing mode with 2 layers (RI=2), Tx antenna N=2 and Rx antenna M=2, in accordance with an embodiment. FIG. 12 illustrates a graph of an exemplary performance comparison of the simple and the conventional CQI estimators for spatial multiplexing (SM) mode with 4 layers (RI=4). Tx antenna N=4, and Rx antenna M=4, in accordance with an embodiment. FIG. 13 illustrates a graph of an exemplary performance comparison of the simple and the conventional CQI estimators for transmit diversity mode with Tx antenna N=2, and Rx antenna M=2, in accordance with an embodiment.

As shown in FIGS. 10-13, each of the PMI estimation approaches have a similar performance in terms of throughput (efficiency). It is noted that all the results shown are based on simulations without the outer loop link adaptation (OLLA). OLLA is an approach to more accurate link adaptation and better throughput. It monitors the retransmission rate in the hybrid automatic repeat request (HARQ) process and adjusts the eSINR accordingly to reach the targeting block error rate (BLER). The performance difference between the CCESM/NAESM and the EESM/MIESM can be further reduced by the means of the OLLA. It should be noted that although the CQI estimators are derived with reference to MMSE or zero-force linear receivers, the derived CQI estimators can be used in any other kind of receivers, such as the maximum-likelihood based receivers.

Figure 14:
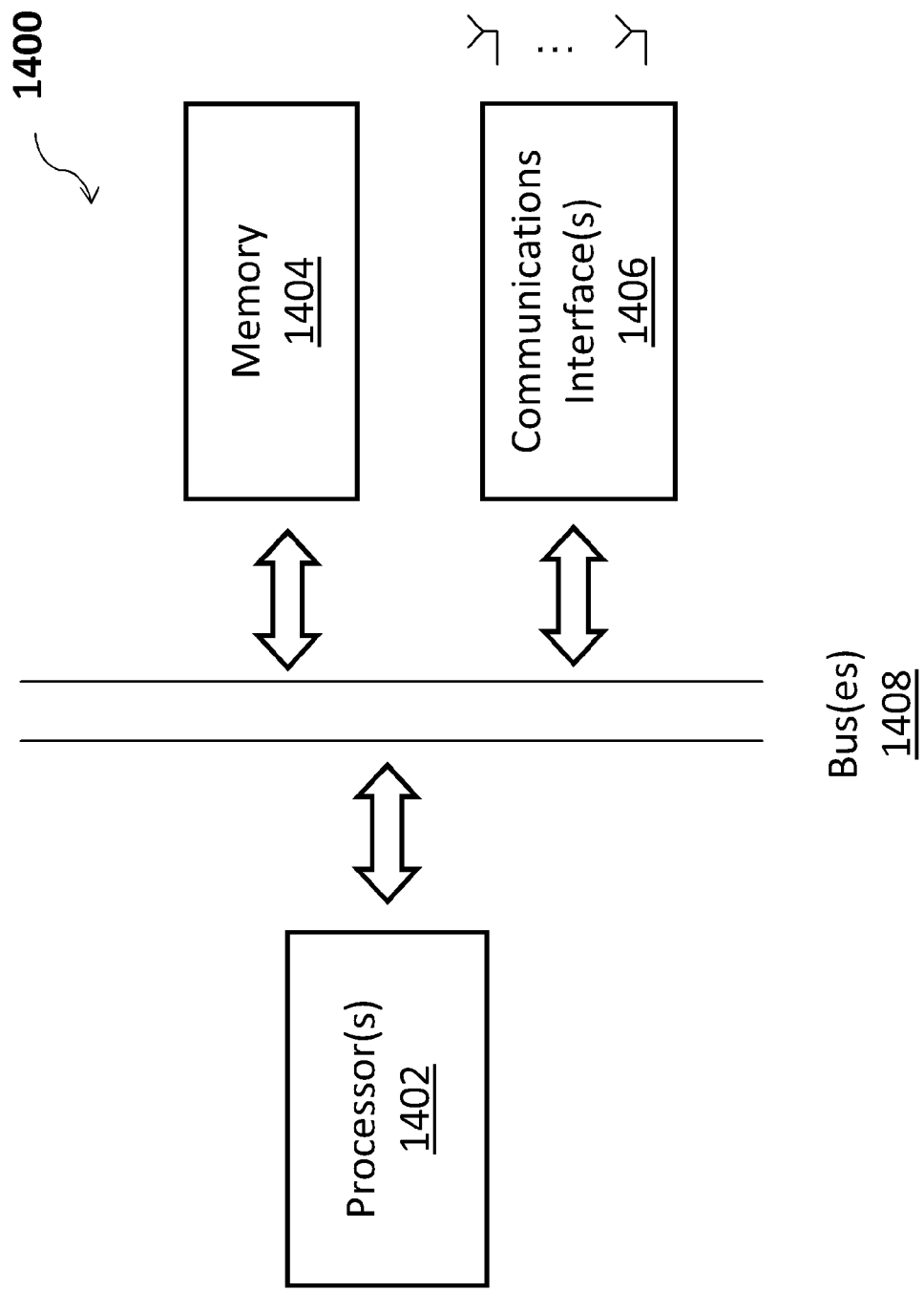
FIG. 14 illustrates a block diagram of exemplary components of user equipment (UE), in accordance with an embodiment.

FIG. 14 illustrates a block diagram of exemplary components of an UE 1400, such as in FIG. 1, in accordance with an embodiment. The UE 1400 includes processor(s) (or controllers) 1402, memory 1404, communications interface(s) 1406, bus(es) 1208 for interconnecting components of the UE, and computer programs.

The memory 1404 can be a non-transitory computer-readable storage medium used to store executable instructions, or computer program thereon. The memory 1404 may include a read-only memory (ROM), random access memory (RAM), programmable read-only memory (PROM), erasable programmable read-only memory (EPROM), a smart card, a subscriber identity module (SIM), or any other medium from which a computing device can read executable instructions or a computer program. The term "computer program" is intended to encompass an executable program that exists permanently or temporarily on any computer-readable storage medium as described above.

The computer program also includes an algorithm that includes executable instructions stored in the memory 1404 that are executable by the processor(s) 1402, which may be facilitated by one or more of the application programs also stored on the memory 1404. The application programs may also include, but are not limited to, an operating system or any special computer program that manages the relationship between application software and any suitable variety of hardware that helps to make-up a computer system or computing environment of UE 1400. For example, the computer program may also include those for the RI, PMI and CQI estimators (or methodology) discussed in this disclosure.

The communications interface(s) 1406 include transmit and receive circuitry (or components) for conducting wireless or line-based communications with a network or network node, or other communications-enabled devices. For example, the communications interface(s) can include line-based interface(s), and one or more transmit antennas and one or more receive antennas for conducting wireless communications.

Figure 15:
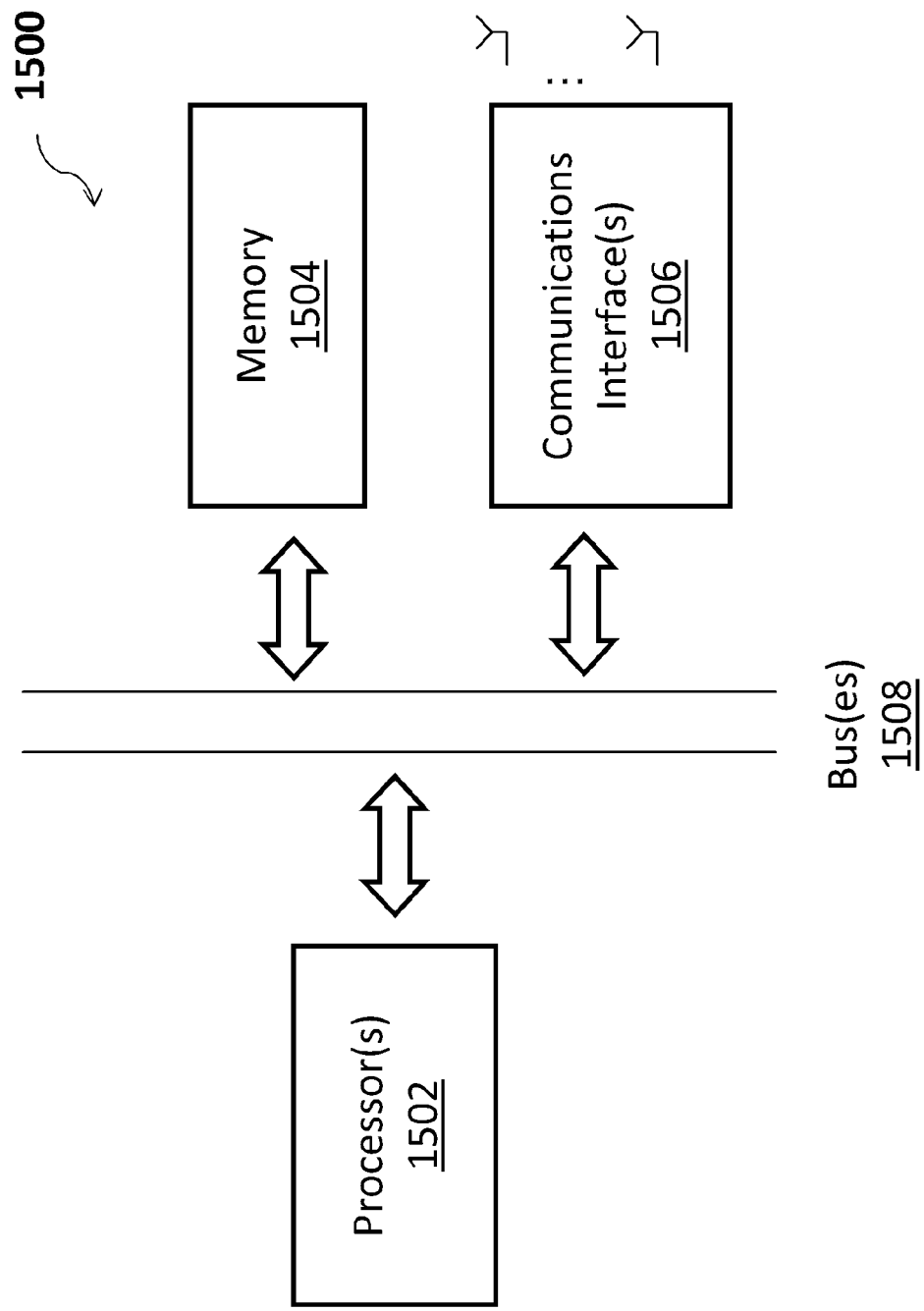
FIG. 15 illustrates a block diagram of exemplary components of a network node, in accordance with an embodiment.

FIG. 15 illustrates a block diagram of exemplary components of a network node 1500, such as in FIG. 1, in accordance with an embodiment. The network node 1500 includes processor(s) (or controllers) 1502, memory 1504, communications interface(s) 1506, bus(es) 1508 for interconnecting components of the network node, and computer programs.

The memory 1504 can be a non-transitory computer-readable storage medium used to store executable instructions, or computer program thereon. The memory 1504 may include a read-only memory (ROM), random access memory (RAM), programmable read-only memory (PROM), erasable programmable read-only memory (EPROM), a smart card, a subscriber identity module (SIM), or any other medium from which a computing device can read executable instructions or a computer program. The term "computer program" is intended to encompass an executable program that exists permanently or temporarily on any computer-readable storage medium as described above.

The computer program also includes an algorithm that includes executable instructions stored in the memory 1504 that are executable by the processor(s) 1502, which may be facilitated by one or more of the application programs also stored on the memory 1504. The application programs may also include, but are not limited to, an operating system or any special computer program that manages the relationship between application software and any suitable variety of hardware that helps to make-up a computer system or computing environment of network node 1500.

The communications interface(s) 1506 include transmit and receive circuitry (or components) for conducting wireless or line-based communications with UEs or other components of the network. For example, the communications interface(s) can include line-based interface(s) such as for communications with other network components, and one or more transmit antennas and one or more receive antennas for conducting wireless communications.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method comprising:
   determining a rank indicator (RI);
   determining a precoding matrix index (PMI);
   determining a channel quality indicator (CQI) according to the PMI and RI; and
   reporting information corresponding to the RI, PMI or CQI to a wireless network, wherein the RI, PMI or CQI is determined based on channel covariance estimation, and the channel covariance estimation is performed using
   a first channel covariance matrix based upon a number of receive antennas in a User Equipment (UE) device being greater than or equal to a number of transmit antennas in a network node, and
   a second channel covariance matrix based upon the number of receive antennas in the UE being less than the number of transmit antennas in the network node, wherein the first channel covariance matrix is defined by the expectation of a channel matrix multiplied by a conjugate transpose of the channel matrix for a given resource element number, and the second channel covariance matrix is defined by expectation of the conjugate transpose of the channel matrix multiplied by the channel matrix for the given resource element number.

2. The method according to claim 1, wherein the RI and PMI are separately determined.

3. The method according to claim 1, wherein the RI is determined based on eigenvalue decomposition of the channel covariance matrix.

4. The method according to claim 3, wherein the RI is further determined based on a combination of eigenvalue thresholds and relaxed input signal-to-noise (SNR) or noise power thresholds.

5. The method according to claim 1, wherein the PMI is determined based on mean channel covariance and the Taylor series approximation of its inverse.

6. The method according to claim 1, wherein the PMI is determined with only one matrix inversion per PMI trial.

7. The method according to claim 1, wherein the determining a PMI operation comprises:
   determining an averaged mean square error (MSE) over all resource elements (REs) using channel covariance;
   determining a mean output signal-to interference plus noise ratio (SINR) based on the averaged MSE; and
   selecting an optimum precoding matrix from a set of precoding matrices based on the determined SINR.

8. The method according to claim 1, wherein the CQI is determined based on channel covariance effective SNR mapping (CCESM).

9. The method according to claim 8, wherein the determining CQI operation comprises:
   determining the channel covariance matrix;
   determining mean-square-error (MSE) based the channel covariance matrix and on Taylor series approximation; and
   determining an effective signal-to-interference-plus-noise-power-ratio (eSINR) based on the MSE.

10. The method according to claim 9, wherein the MSE is based on a Taylor series approximation in which higher orders are truncated, the determining CQI operation further comprising:
    determining a compensation factor for the determined MSE for compensating the truncation effect in the Taylor series approximation.

11. The method according to claim 9, wherein the Taylor series approximation includes one or more higher 2*n orders in the approximation, where n is greater than or equal to one.

12. The method according to claim 9, wherein the determining CQI operation further comprises:
    determining an error item that is a difference between an instant channel correlation at a particular resource element and an averaged channel covariance matrix, wherein the MSE is further determined based on the error item.

13. The method according to claim 1, wherein the CQI is determined with only one matrix inversion per CQI for a channel covariance matrix.

14. The method according to claim 1, wherein the CQI is determined without any non-linear function evaluations.

15. The method according to claim 1, wherein the CQI is determined based on noise-power average effective SNR mapping (NAESM).

16. A device comprising:
    memory; and
    one or more processors for determining a rank indicator (RI), determining a precoding matrix index (PMI), and determining a channel quality indicator (CQI), the RI, PMI or CQI being determined based on channel covariance estimation wherein the channel covariance estimation is performed using a channel covariance matrix defined by $E\{H_k H_k^H\}$ when M≥N and $E\{H_k^H H_k\}$ when M<N wherein M is a number of receive antennas in a User Equipment (UE) device, N is a number of transmit antennas in a network node, $H_k$ is a channel matrix, k is a resource element number, H denotes conjugate transpose, and E is an expectation.

17. The device according to claim 16, wherein the RI and PMI are separately determined.

18. The device according to claim 16, wherein the CQI is determined based on channel covariance effective SNR mapping (CCESM).

19. A method comprising:
    receiving a channel quality indicator (CQI) associated with a rank indicator (RI) and a precoding matrix index (PMI) from user equipment, the RI, PMI or CQI being determined based on channel covariance estimation wherein the channel covariance estimation is performed using a channel covariance matrix defined by $E\{H_k H_k^H\}$ when M≥N and $E\{H_k^H H_k\}$ when M<N wherein M is a number of receive antennas in a User Equipment (UE) device, N is a number of transmit antennas in a network node, $H_k$ is a channel matrix, H denotes conjugate transpose, k is a resource element number, and E is an expectation; and
    controlling communications for a wireless network based on the received CQI.

20. The method according to claim 19, wherein the RI and PMI are separately determined.

21. The method according to claim 19, wherein the CQI is determined based on channel covariance effective SNR mapping (CCESM).

22. A device comprising:
    memory;
    communications interface for receiving wireless transmissions; and
    one or more processors for: receiving a channel quality indicator (CQI) associated with a rank indicator (RI) and a precoding matrix index (PMI) from user equipment, the RI, PMI or CQI being determined based on channel covariance estimation wherein the channel covariance estimation is performed using a channel covariance matrix defined by $E\{H_k H_k^H\}$ when M≥N and $E\{H_k^H H_k\}$ when M<N wherein M is a number of receive antennas in a User Equipment (UE) device, N is a number of transmit antennas in a network node, $H_k$ is a channel matrix, k is a resource element number, H denotes conjugate transpose, and E is an expectation, and
    controlling communications for a wireless network based on the received CQI.

23. The device according to claim 22, wherein the RI and PMI are separately determined.

24. The device according to claim 22, wherein the CQI is determined based on channel covariance effective SNR mapping (CCESM).

* * * * *